United States Patent

[11] 3,588,453

[72] Inventor Raffaele Becchi
Ivrea, Italy
[21] Appl. No. 793,830
[22] Filed Jan. 24, 1969
[45] Patented June 28, 1971
[73] Assignee Ing. C. Olivetti & Co., S.p.A.
Ivrea (Torino), Italy
[32] Priority Jan. 29, 1968
[33] Italy
[31] 50315-A/68

[54] READER FOR A PUNCHED PAPER TAPE OR OTHER PUNCHED SUPPORT
15 Claims, 6 Drawing Figs.

[52] U.S. Cl. .......... 235/61.11
[51] Int. Cl. .......... G06k 7/01
[50] Field of Search .......... 235/61.11, 61.112, 61.113; 200/46

[56] References Cited
UNITED STATES PATENTS

| | | | |
|---|---|---|---|
| 3,201,571 | 8/1965 | Gryk .......... | 235/61.11 |
| 3,231,720 | 1/1966 | MacNeill .......... | 235/61.11 |

*Primary Examiner*—Daryl W. Cook
*Attorney*—Kevin C. McMahon

ABSTRACT: A high-speed reader for punched data wherein reading is effected by a series of code elements during advance of the punched medium, the code elements being mounted on a frame to which there is fixed an advancing shoe, the frame being movable along a closed path to permit the shoe to engage the punched support intermittently and effect the advance. The frame is provided with a window cooperating with a cam constantly in contact with a plurality of edge points of said window such that rotation of said cam causes said frame to cycle along a path substantially similar to the configuration of said window.

INVENTOR.
RAFFAELE BECCHI

BY Thomas N. Tarrant
ATTORNEY

INVENTOR.
RAFFAELE BECCHI

BY Thomas N. Tarrant
ATTORNEY

INVENTOR
RAFFAELE BECCHI

BY Thomas N. Lamont
ATTORNEY

READER FOR A PUNCHED PAPER TAPE OR OTHER PUNCHED SUPPORT

BACKGROUND OF THE INVENTION

The present invention relates to a reader for a punched support for recorded data, for example a punched paper tape for a teleprinter system, of the type wherein reading is effected by a series of code elements during the advance of the support by one step, the elements being mounted on a frame to which there is fixed an advance-operating shoe, the frame being movable along a closed path to permit the shoe to engage the punched support intermittently and effect the advance.

In a known device of the aforesaid type, the frame carrying the sensing elements and the advance shoe is spring-biased perpendicularly to the recording support to be read and is adapted to be actuated with a rectilinear motion by means of a pair of eccentrics during the advance and reading of the punched support and with a substantially elliptical motion when the sensing elements and the shoe are disengaged from the support. Because of the negative action of the spring on the frame, this device is not suitable for high reading speeds.

SUMMARY OF THE INVENTION

The object of this invention is to provide an improved reader which is suitable for high reading speeds.

According to the invention there is provided a reader for a punched paper tape or other punched support for recorded data, wherein the reading is effected by a series of code elements during the advance of the support by one step, the code elements being mounted on a frame to which there is fixed an advancing shoe, the frame being provided with a window in the form of an equal sided quadrilateral cooperating with a cam constantly in contact with a point of each edge of the window, the profile of the cam comprising a plurality of sides in the form of circular arcs such as to cause the frame to be moved along a path substantially similar to the quadrilateral, thereby to engage the shoe intermittently with the punched support and effect the advance.

According to the invention in another aspect there is provided a reader for a punched paper tape or other punched support for recorded data, comprising a pair of frames each carrying a series of code elements, and means for moving the frames along closed paths, one part of each being such as to allow the corresponding code elements to read a code combination during the advance of the punched support, another part being adapted to allow return movement of the frame to rest, the moving means being such that the two frames alternate in sensing the punched support, so that during the reading movement of one of the frames the other frame effects its return movement.

The invention will be described in more detail, by way of example, with reference to the accompanying drawings.

DESCRIPTION OF THE PREFERRED EMBODIMENT

Figure 1:
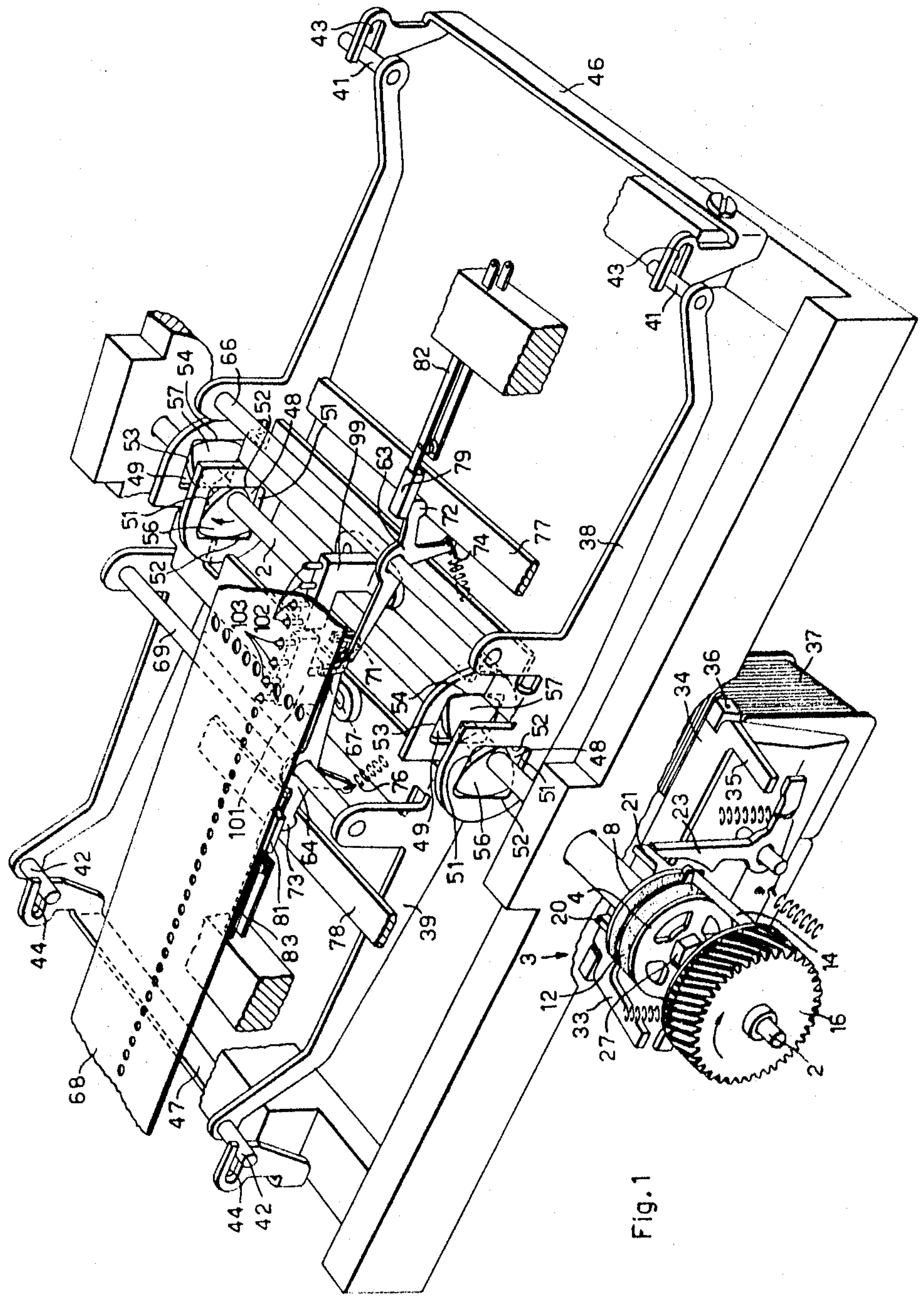
FIG. 1 is a rear perspective view from the right of a perforated paper tape reader embodying the invention, for teleprinter systems.

Referring to FIG. 1, a main shaft 2 of a reader for a punched paper tape 68 is adapted to be rotated clockwise cyclically to actuate the reader by the driven part of a clutch 3 having a 180° cycle. The driven part of the clutch 3 comprises a first disc 4 (FIG. 2) which is slidable axially but locked angularly by means of a lug 6 in a groove 7 in the shaft 2. A second disc 8 is integral with a hub 10 having two notches 9 sliding axially on two diametrically opposite pins 11 fixed to the shaft 2.

The discs 4 and 8 are adapted to be rotated by the driving part of the clutch 3, which driving part comprises a ring 12 of material having a high coefficient of friction. The ring 12 is equipped with two forks 13 in which there are engaged two pins 14 (FIG. 1) fixed to a helical gear 16. This gear is rotatable on the shaft 2 and is rotated continuously by an electric motor of the machine, not shown in the drawing.

Figures 2, 3, 5:
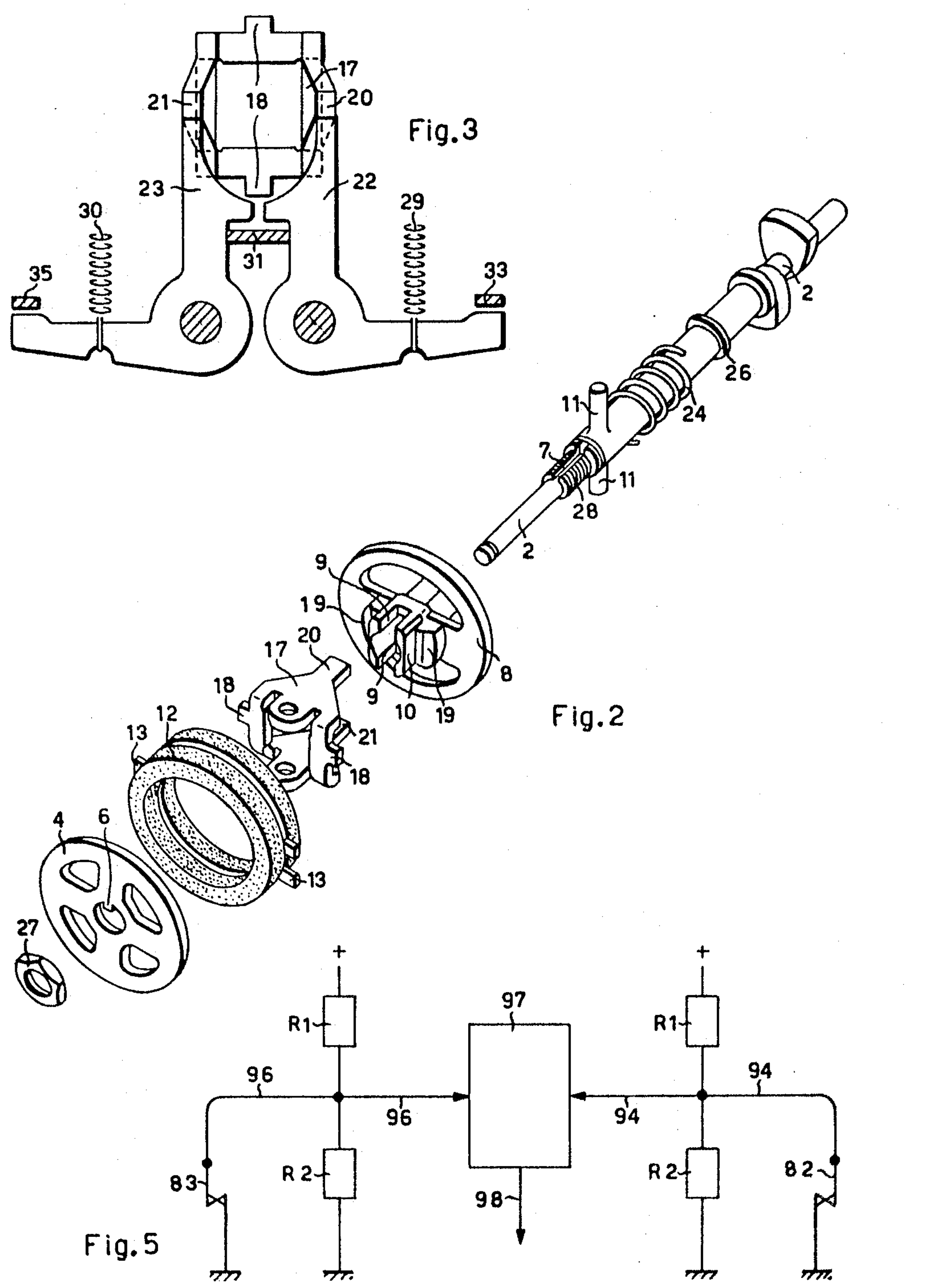
FIG. 2 is an exploded perspective view of a detail of the paper tape reader in a different angular position.
FIG. 3 is a partial side view from the left of a detail of FIG. 1 on a larger scale.
FIG. 5 is a block diagram of the control circuit of the paper tape reader.

On the two pins 11 (FIG. 2) there is moreover pivoted a frame 17 provided with two dogs 18 each adapted to cooperate with a corresponding projection 19 of the disc 8. The frame 17 is moreover provided with two arms 20 and 21 normally engaged by the ends of two corresponding symmetrical levers 22 and 23 (FIG. 3). The levers 22 and 23 normally hold the frame 17 tilted about pins 11 (FIGS. 1 and 2) and acting by means of one of the dogs 18 against the front surface of projection 19 to urge disc 8 axially in opposition to the force of a compression spring 24. Displacement of disc 8 disengages clutch 3. A nut 27 normally screwed on to a thread 28 of the shaft 2 prevents the disc 4 and the ring 12 from slipping off the shaft 2.

The levers 22 and 23 (FIG. 3) normally bear under the action of corresponding springs 29 and 30 against a fixed stop 31. The levers 22 and 23 moreover cooperate with corresponding arms 33 and 35 fixed to the armature 34 (FIG. 1) of an electromagnet 37, the armature being pivoted on a fixed shaft 36. The electromagnet 37 is energized in a manner known per se to institute each 180° rotation of the shaft 2.

Figure 4:
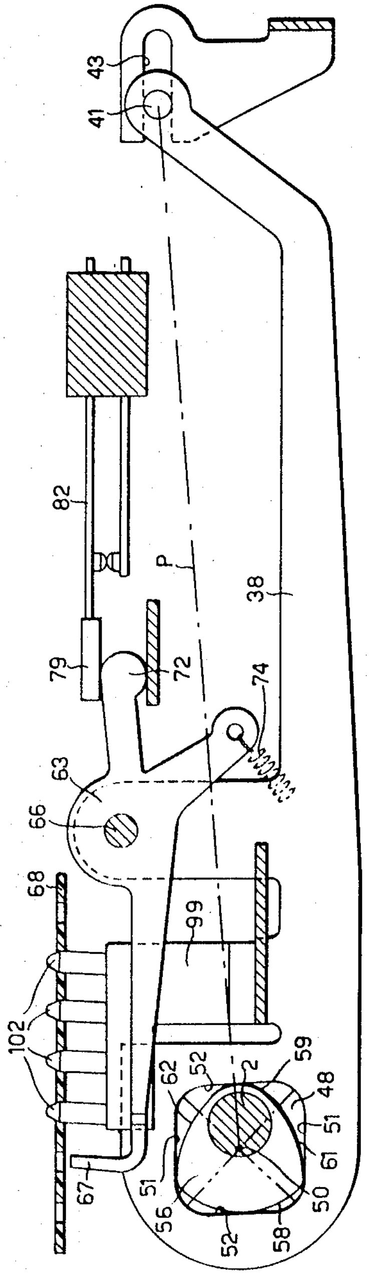
FIG. 4 is a partial side view from the right of another detail of FIG. 1 on a larger scale.

The reader moreover comprises two frames 38 and 39, respectively, which are alike and disposed symmetrically with respect to the shaft 2. The frames 38 and 39 are each provided with a pair of pivot pins 41 and 42, respectively, adapted to slide in slots 43 and 44 of corresponding cross bars 46 and 47 fixed to the main frame of the reader. In the frame 38 there is formed a pair of windows 48 which are of rhombic form and alike and the edges 51, 52 of which normally cooperate with a corresponding pair of like cams 56 of substantially triangular form fixed eccentrically to the shaft 2. More particularly, each cam 56 (FIG. 4) has a profile composed of four circular arcs 58, 59, 61 and 62. The two circular arcs 58 and 59 are concentric with the shaft 2 and have two radii of curvature such that their difference is equal to the advance step of the paper tape (FIG. 1) and therefore to the distance between two transverse rows of holes of the tape 68. The circular arcs 61 and 62 (FIG. 4), on the other hand, are equal and have their center of curvature on one of the ends of the arc 58 and a radius of curvature equal to the sum of the radii of curvature of the arcs 58 and 59.

In the frame 39 (FIG. 1) there is formed a pair of windows 49 which are symmetrical with respect to the windows 48 and the edges 53, 54 of which cooperate with a pair of cams 57 similar to the cams 56. The cams of each pair 56 and 57 are fixed to the shaft 2 in the same angular position, but the pair of cams 56 is offset angularly through 180° with respect to the pair of cams 57.

When the reader is stationary, the cams 56 and 57 have their axes of symmetry disposed horizontally as in FIG. 1. In this position, the edges 51 (FIG. 4) of the window 48 are disposed horizontally. The inclination of the edges 52 with respect to the edges 51 is such that when the reader is stationary the edges 52 are perpendicular to the plane P passing through the axis of the pins 41 and through the center 50 of the windows 58. Correspondingly, the edges 53 (FIG. 1) of the windows 49 are horizontal and the edges 54 are perpendicular to the plane common to the axis of the pins 42 and to the center of the windows 49. The distance between the center 50 of the windows 48 and the center of the windows 49 is equal to the advance step of the paper tape.

To each of the frames 38, 39 (FIG. 1) there is moreover fixed a shoe 99, 101, respectively, each of which shoes is provided with a series of pegs 102, 103 which, when the reader is stationary, are all partially engaged in the conventional draw holes of the paper tape. The pegs 102 and 103 are arranged tangentially to their path of rotation about the pins 41 and 42, respectively (see FIG. 4).

The reader moreover comprises for each frame 38, 39 a series of eight code elements or sensing levers 63 and 64, respectively, of which only one is shown per series in FIG. 1. The levers 63 and 64 are alike and are disposed symmetrically with respect to the shaft 2. More particularly, the sensing levers 63 are pivoted on a shaft 66 fixed to the frame 38. Each lever 63 is provided with a projection 67 adapted to sense a track of the combination of an 8-bit code punched in the paper tape 68.

The sensing levers 64, on the other hand, are pivoted on a shaft 69 fixed to the frame 39. Each of these levers is provided with a projection 71 adapted to sense a code unit of the same track of perforations sensed by the symmetrically disposed sensing lever 63. To this end, the projections 67 and 71 of pairs of corresponding sensing levers are bent by the respective levers 63 and 64 in such manner as to be aligned along the direction of movement of the paper tape 68. When the reader is stationary, the projections 67 and 71 are wholly below the tape 68 to be read.

Each sensing lever 63, 64 is provided with an arm 74, 73 respectively, which, by the action of a spring 74, 76, respectively, is normally made to bear against a fixed bar 77, 78, respectively.

Each arm 72, 73 is adapted to cooperate with a block 79, 81, of insulating material fixed to a corresponding electric contact 82, 83, respectively, (FIG. 5) which is normally closed. Each contact 83, 83 is connected to a voltage divider $R_1$, $R_2$ fed from the power supply.

The contacts 82, 83 relating to the same track of the paper tape 68 are connected to two corresponding inputs 94 and 96 of an OR circuit 97 adapted to emit a signal on a single output 98 when at least one of the inputs 94, 96 of the pair is energized. The circuit of FIG. 5 is reiterated eight times, that is equal to the number of tracks of the paper tape 68.

The reader operates in the following manner.

Normally, the gear 16 (FIG. 1) is rotated clockwise continuously together with the driving ring 12 of the clutch 3. By energizing the electromagnet 37, the armature 34 is rotated counterclockwise and, by means of the arms 33 and 35, causes the two levers 22 and 23 (FIG. 3) to rotate simultaneously. In this way, the upper ends of the levers 22 and 23 release the frame 17, which jumps clockwise owing to the action of the compression spring 24 (FIG. 2). The latter then urges the disc 8 against the ring 12, which in turn pushes the disc 4 until the latter is stopped against the nut 27. The ring 12 thus begins to rotate the two discs 4 and 8 by friction together with the shaft 2 (FIG. 1) and the cams 56 and 57 for a cycle of 180° in a clockwise direction. The cams 56 and 57 simultaneously actuate the two frames 38 and 39.

More particularly, the cam 56, acting by the profile 62 (FIG. 4) on the edge 51, begins to cause the window 48 to move upwardly so that the center 50 thereof (FIG. 4) travels along a portion AB (FIG. 6) of a path 104, while the pins 41 of the frame 38 turn in the slots 43 without translating. The pegs 102 of the shoe 99 enter fully the draw holes in the paper tape 68, while the shaft 66 rises and allows the springs 74 to rotate the sensing levers 63 clockwise on said shaft to engage the paper tape 68 by means of the projections 67. Those levers 63, the projections 67 of which encounter a hole in the tape 68, thus moving the arms 72 away from the blocks 79 of the respective contacts 82, continue to rotate clockwise on the shaft 66.

On the other hand, those levers 63, the projections 67 of which do not encounter a hole, are arrested by the tape 68 and begin to rotate counterclockwise on the shaft 66, acting by means of their arms 72 on the blocks 79 in such manner as to open the corresponding contacts 82. On the contacts 82 (FIG. 5) opening, they cause the current to flow through $R_2$, producing a signal at the input 94 of the circuit 97, which emits a signal on the line 98. The signals obtained in this way on the various lines 98 are then suitably serialized in a manner known per se, to send the relevant code combination read to the telegraph line.

When the shaft 2 has rotated through about 45°, the cam 56 brings the two profiles 58 and 59 concentric with the shaft 2 into contact with the horizontal edges 51 of the window 48, while it engages the vertical edges 52 of the window 48 with the two profiles 61 and 62. The center 50 of the window 48 then begins to travel along the portion BC (FIG. 6) of the path 104, while the pins 41 (FIG. 4) translate in the slots 43 without rotating. The pegs 102 then remain in engagement with the holes in the tape 68, which is shifted to the right by one step together with the sensing levers 63. The latter thus hold the contacts 82 in the position reached throughout the duration of the advance of the tape 68.

At about 135° through the cycle, the cams 56 bring the two concentric profiles 58 and 59 into contact with the vertical edges 52 of the window 48 and the two profiles 62 into engagement with the horizontal edges 51. The profiles 62 now cause the window 48 to move downwardly in such manner as to cause its center 50 to travel along a portion CD (FIG. 6) of the path 104, while the pins 41 of the frame 28 rotate in the slots 43 without translating. The pegs 104 then disengage themselves from the draw holes in the tape 68, while the shaft 66 is lowered and causes the levers 63 to return to the angular position of FIG. 4, thus causing the contacts 82 which had been opened to be reclosed. At 180° through the cycle, the frame 38, together with the shoe 99 and the levers 63, are now shifted by one step to the right with respect to the position of FIG. 4.

If, after the shaft 2 has rotated through 180°, the electromagnet 37 is energized, the clutch 3 still remains engaged and permits a following cycle of 180° of the shaft 2. In the first 45° of the cycle, the cam 56 (FIG. 4) now continues to cause the window 48 to be lowered through the medium of the profiles 62, so that its center 50 travels along a portion DE of the path 104, while the pins 41 rotate in the slots 43. The pegs 102 and the projections 67 of the levers 63 then move away from the paper tape 68.

In the following 90° of the cycle, the profiles 62 of the cams 56 engage the vertical edges 52 of the window 48, causing the frame 48 to translate so that its center 50 travels along a portion EF of the path 104. During this travel, the pegs 102 and the projections 67 of the levers 63 have no effect on the tape 68.

In the last 45° of the cycle, the profiles 62 of the cams 56 reengage the horizontal edges 51 of the window 48, as a result of which the center 50 travels along a portion FA of the path 104, which is thus closed, while the pins 41 rotate in the slots 43. The pegs 102 and the levers 63 thus return to the position of FIGS. 1 and 4.

It is therefore clear that the center 50 moves along a closed path substantially similar to the quadrilateral of the window 48.

Figure 6:
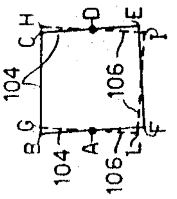
FIG. 6 is a diagram of the kinematics of the reader.

Since the pair of cams 57 (FIG. 1) is angularly offset through 180° with respect to the pair of cams 56, during the first of the two 180° cycles of the shaft 2 hereinbefore described, while the center 50 of the windows 48 travels clockwise along the portion ABCD of the path 104 (FIG. 6), the center of the windows 49 travels clockwise, and with a motion which is substantially opposite instant by instant to that of the center of the windows 48, along a portion DILA of a path 106 indicated by a dash line in FIG. 6.

More particularly, in the first 45° of the first cycle of the shaft 2 (FIG. 1), the pegs 103 of the shoe 101 move downwardly and move away from the draw holes of the paper tape 68, while the shaft 69 is lowered and causes the sensing levers 64 to turn about the point of contact with the bar 78, moving the projections 71 away from the tape 68.

In the following 90° of the cycle of the shaft 2, the pegs 103 move to the left and withdraw by one step together with the projections 101 of the sensing levers 64 without having any effect on the tape 68. In the last 45° of the cycle of the shaft 2, the pegs 103 move upwardly, being restored to the height of the draw holes of the paper tape 68 together with the projections 71 of the sensing levers 64. The pegs 103 and the projections 71 are then moved by one step to the left with respect to the position shown in the drawing.

During the second cycle of the shaft 2, while the center 50 (FIG. 4) of the windows 48 travels clockwise along a part DEFA (FIG. 6) of the path 104, the center of the windows 49 travels in similar manner along a part AGHD of the path 106 shown in dashes in said FIG. 6.

The reading of the following code combination punched in the tape 68 (FIG. 1) is effected by the projections 71 of the sensing levers 64 during the travel GH in a similar manner to what has been seen before in the case of the levers 63. The signals are now produced by the contacts 83 (FIG. 5) and sent to the input 96 of the circuit 97, which emits these signals from the output 98 as in the preceding case.

If, at the moment when the shaft 2 is at the end of a cycle, the electromagnet 37 is not energized, the levers 22 and 23 (FIG. 3) are released by the arms 33 and 35 of the armature 34 and return to their inoperative position, that is the position in which they bear against the fixed stop 31. At the end of the reading cycle in progress, one of the arms 20 and 21 (FIG. 2) of the frame 17 encounters the lever 23 (FIG. 3) and is arrested thereby, while the other one of the arms 20 and 21 causes the lever 22 to turn counterclockwise slightly.

The frame 17 arrested in this way turns about the pins 11 (FIG. 2), so that by means of one of the dogs 18 it acts on the corresponding projection 19 and pushes the disc 8 in the axial direction, overcoming the spring 24 and separating the driving ring 12 from the disc 4 and the disc 8 from the ring 12, as a result of which the clutch is disengaged again. The said other arm then releases the lever 22 (FIG. 3) which, biased by the spring 29, rotates clockwise slightly until it bears against the stop 31, thereby preventing rebound of the shaft 2.

The electromagnet 37 can be energized continuously during the operation of the reader, in which case the speed of transmission is regulated by the input gear 16. The electromagnet 37 can also, however, be energized by means of pulses of brief duration at each code combination to be read. In this case, the reading speed is given by a timing device, for example of electric type, and the reader functions asynchronously.

To make the paper tape 68 return to the rear (to the left in FIG. 1), the running direction of the tape 68 can be reversed by causing the gear 16 to rotate counterclockwise in any known manner. The projections 67 and 71 of the sensing levers 63 and 64 and the shoes 99 and 101 then travel along the same paths as are shown in FIG. 6, but counterclockwise.

I claim:

1. A high-speed reader for a punched paper tape or other punched support for recorded data, wherein the reading is effected by a series of code elements during the advance of the support by one step, the code elements being mounted on a frame to which there is fixed an advancing shoe, the frame being movable along a closed path to permit the shoe to engage the punched support intermittently and effect the advance, characterized in that the frame is provided with a window in the form of a quadrilateral cooperating with a cam constantly in contact with a point of each edge of the window, the profile of the cam comprising a plurality of sides in the form of circular arcs such as to cause the frame to be moved along a path substantially similar to the quadrilateral.

2. A reader as in claim 1, characterized in that said quadrilateral is a rhombus.

3. A reader as in claim 2, characterized in that the profile of the cam comprises two concentric circular arcs with radii such that their difference is equal to the said step and which are connected by another two circular arcs with a radius equal to the sum of the radii of the said concentric arcs, each of the said other two circular arcs having a center on one end of that one of the two concentric arcs whose radius is greater.

4. A reader as in claim 3, characterized in that the frame is constituted by a connecting rod having a member slidable and rotatable in a rectilinear guide, a pair of the edges of the window being perpendicular to the plane common to the axis of the connecting rod and to the center of the quadrilateral.

5. A reader according to claim 1 further characterized by a second frame disposed symmetrically with respect to said first frame and operated by a second cam similar to said first cam and offset through 180° with respect thereto, as a result of which the two frames alternate in reading said support.

6. A reader as in claim 5, characterized in that the two contacts corresponding to a perforation track of the punched support are connected to a circuit element adapted to produce the presence of an output signal when at least one of the two contacts is changed over.

7. A reader according to claim 1, characterized in that a clutch with a 180° cycle actuates said cam, said clutch comprising a single release member pivoted on an axis normal to the axis of the cam and rotatable with the cam, said release member comprising means to lock said release member in one of two diametrically opposite positions.

8. A reader as in claim 7, characterized in that the release member is provided with two elements cooperating with a pair of levers, the two levers controlling rotation of the clutch in two opposite directions whereby one lever controls the engagement and disengagement of the clutch and the other lever prevents rebound of the cam, and characterized further in that actuating means comprising a single member is arranged to actuate both of said levers simultaneously.

9. A reader as in claim 8, comprising a driving part of the clutch adapted to rotate selectively in one or the other of two directions, characterized in that the said levers are symmetrical and are actuated by the armature of an electromagnet in like manner in both cases, the lever which operates said clutch for rotation in one direction being adapted to prevent the rebound through rotation in the other direction and vice versa.

10. A high-speed reading method for a punched paper tape or other punched support for recorded data, characterized in that a pair of frames each carrying a series of code elements are moved along closed paths, one part of each path being such as to allow the corresponding code elements to read a code combination during the advance of the punched support, another part being adapted to allow return movement of the frame to rest, the two frames alternating in sensing the punched support, so that during the reading movement of one of the frames the other frame effects its return movement.

11. Reading apparatus for a strip recording medium in which recorded intelligence takes the form of perforations comprising:

a. a support base defining a path for transporting said recording medium;
b. a shaft mounted on said base transversely to said path;
c. at least one frame member mounted for oscillating movement on said base and having at least one window traversed by said shaft;
d. an eccentric cam mounted on said shaft inside and contacting the edges of said window;
e. pin means mounted on said frame to engage apertures in said recording medium for synchronizing the movement of said recording medium and said frame;
f. a plurality of sensing elements mounted on said frame for sensing apertures in said recording medium while synchronized to the movement of said frame by said pin means; and
g. means to selectively rotate said shaft whereby said frame follows a cyclical path determined by the interaction of said cam and said window so as to engage said recording medium with said pins during an incremental movement along said path, disengage said pins, return to its starting point and repeat.

12. Reading apparatus according to claim 11 in which said window is a quadrilateral.

13. Reading apparatus according to claim 11 in which said window is a rhombus.

14. Reading apparatus according to claim 11 in which said window is a square.

15. Reading apparatus according to claim 11 in which said at least one frame member comprises two frame members mounted for oscillatory movement and at least two similar eccentric cams are mounted on said shaft each inside a window of a respective frame, said two eccentric cams being 180° angularly displaced with respect to each other whereby said two frames move 180° out of phase with each other in the same oscillatory direction.